Aug. 9, 1966  E. RIEGLER  3,264,680
APPARATUS FOR SHIRRING SAUSAGE CASINGS
Original Filed Jan. 24, 1962
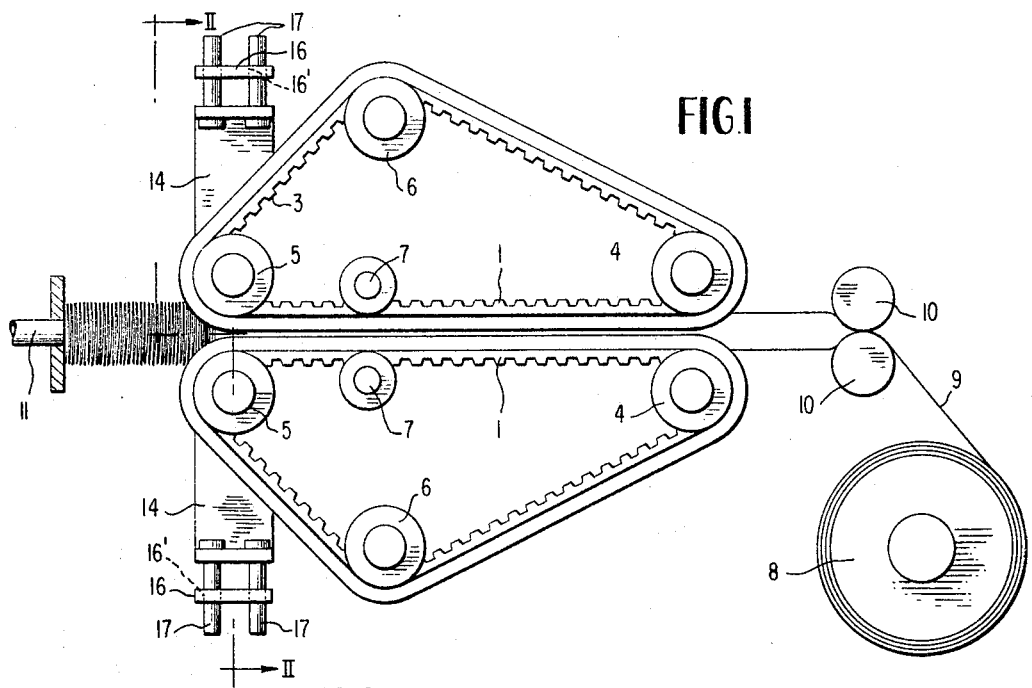
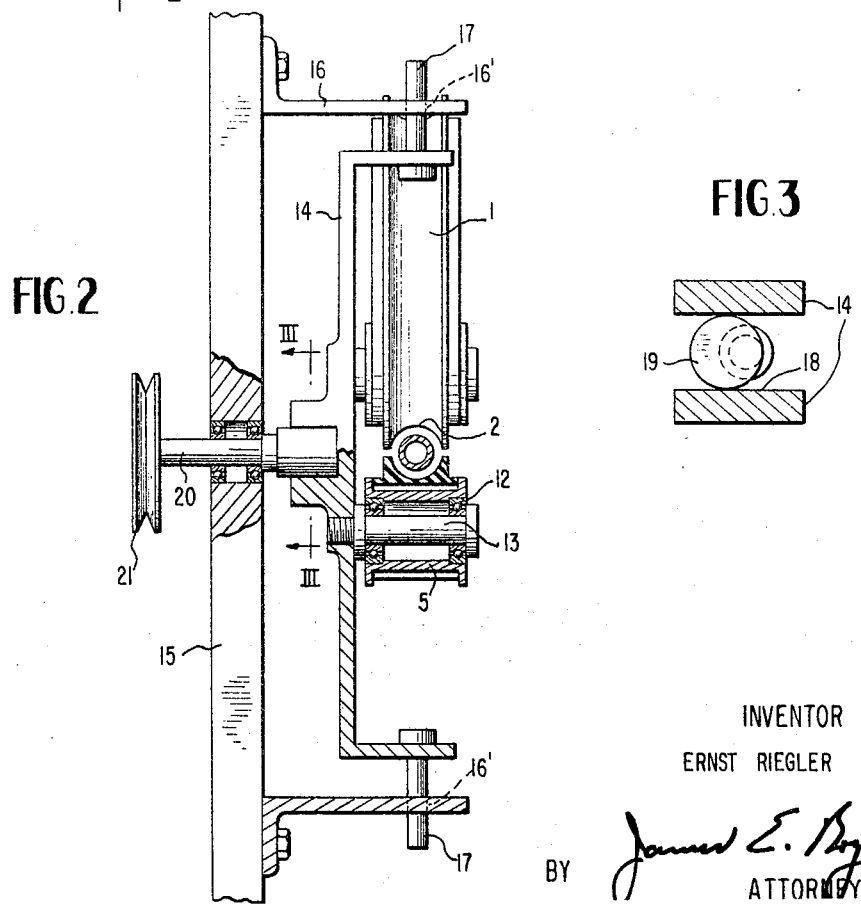
INVENTOR
ERNST RIEGLER
BY James E. Bryan
ATTORNEY United States Patent Office 3,264,680
Patented August 9, 1966

3,264,680
APPARATUS FOR SHIRRING SAUSAGE CASINGS
Ernst Riegler, Niederwalluf, Rheingau, Germany, assignor to Kalle Aktiengesellschaft, Wiesbaden-Biebrich, Germany
Original application Jan. 24, 1962, Ser. No. 168,556, now Patent No. 3,201,825, dated Aug. 24, 1965. Divided and this application Dec. 21, 1964, Ser. No. 420,029
Claims priority, application Germany, Jan. 26, 1961, K 42,739
6 Claims. (Cl. 17—42)

This application is a division of application Serial No. 168,556, filed January 24, 1962, now Patent No. 3,201,825, issued August 24, 1965.

This invention relates to an apparatus for shirring sausage casings.

Sausage casings are sometimes prepared in shirred form for the purpose of handling them more satisfactorily on sausage filling machines, i.e. they are so compressed, with the formation of creases, that a more or less stiffened hollow concertina-like body is formed from the sausage casing. For filling with the sausage filling material, the hollow concertina-like body is then placed on the filling nozzle of the filling machine.

Several methods and arrangements used for shirring sausage casings are known. Thus, the sausage casing, which is inflated if necessary, can be either compressed manually or pushed over a mandrel and caused to be compressed between parallel-guided parts of revolving endless belts or chains provided with claws or finger-like projections. Methods are also known in which the sausage casings are compressed by means of profiled wheels. In these known methods, the feed is produced by those sides or edges of the fingers, claws or profiled parts which are located at the front in the direction of movement, after the sausage casing has already been deformed in undulating fashion before compression. In this method of shirring sausage casings, damage may occur at the bulging or rounded-out parts of the sausage casing owing to the feed pressure exerted. Moreover, at the end of the conveying action performed by means of the fingers or profiled grooves a more or less considerable chafing always takes place between the sausage casing and said fingers or profiled grooves owing to their being turned out of the conveying direction. Attempts have been made to alleviate this drawback by suitably controlled sudden turning away of the fingers, but it has not been possible to eliminate it completely and it has been necessary to accept other drawbacks, in particular increased susceptibility of the shirring device to breakdown.

There is a method of shirring sausage casings, wherein a sausage casing on a mandrel is subjected to longitudinal transposition by contact with oppositely disposed revolving endless belts, at least part of the contacting portion of each of which, including the part where the shirred casing leaves them, is caused to undergo pivoting movement away from and towards the casing.

The invention provides an apparatus for carrying out the above method, including a mandrel and two endless belts oppositely disposed with reference thereto and arranged so that portions thereof run in the shirring direction parallel to the mandrel over rollers of which those at the position where the shirred casing leaves the belts are mounted for pivoting movement away from and towards the casing so that at least part of each belt in the contacting range partakes in this pivoting movement. The claws, fingers or profiled wheels which have heretofore been customarily employed are preferably absent, whereby the drawbacks associated with their presence are avoided. The apparatus according to the invention thus substantially has a constant cross-sectional form of the endless belts on that side which faces the mandrel as they run past the same. That side of the belts which faces the mandrel as they run past it, that is the outside, may be shaped according to the desired form of the cross-section of the concertina-like sausage casing, for example round, oval, square, rhombic, rectangular or polygonal. Preferably, two belts shaped on the outside so that they are semicircular in cross-section are employed, by means of which a concertina-like body which is circular in cross-section is produced. The inside of the belts may likewise have a constant cross-sectional form or be of varying shape, for example it may have the form of a conventional flat, V or round belt or be equipped with teeth.

The apparatus of the invention is illustrated by way of example in the accompanying drawings in which:

FIGURE 1 is a front elevation of the apparatus,

FIGURE 2 is a side elevation thereof, partly in section on the line II—II of FIGURE 1, and FIGURE 3 is a rear elevation of a detail in section on the line III—III of FIGURE 2.

Referring to the drawings, two endless belts 1, which are each guided over rollers 4, 5, 6 and 7, run longitudinally along a mandrel 11 on opposite sides thereof. The two belts are provided on their outside, which is the side facing the mandrel as they run along it, with semi-circular grooves, and on the inside with teeth 3. The drive of the belts is effected by means of the rollers 4, which are connected by means of gear wheels and are driven by driving means. The rollers 5 are guide or return rollers which are pivotally mounted in a manner to be described. The rollers 6 serve to tension the belts and the rollers 7 serve as supporting rollers. A sausage casing 9, which is wound flat on a reel or drum 8, is fed forward by a pair of nip rollers 10 and is shirred by means of the driven belts 1 onto the mandrel 11. The sausage casing 9 is advantageously inflated by air under slight pressure, the required air being passed into the interior thereof through the mandrel 11; the pair of nip rollers 10 then serves at the same time as a seal for the air fed it.

In the method carried out by the apparatus of the invention, the regular displacement of the sausage casing with respect to the mandrel before it is compressed, which is desirable for improved stiffness of the concertina-like body produced by the shirring of the sausage casing is obtained by means of an oscillating pivoting movement executed by the belts transversely of their conveying direction, preferably in a plane at right angles thereto. This movement may be vertical or horizontal or both at the same time, and may also alternate between the two, for example it may be gyratory. In the illustrated embodiment, the oscillating movement of the belts is obtained by an oscillating movement of the guide rollers 5 extending perpendicularly to the conveying direction of the belt. The pivot points for the oscillating movements of the belts 1 may be selected as desired, for example they may fall within the axes of the driving rollers 4. Since, however, an oscillating movement extending as fas ar the driving rollers 4 might result in oscillation of the mandrel itself, it is better not to allow oscillation of the belts over about two thirds of their zone of contact with the sausage casing, by maintaining stationary the axes of the supporting rollers 7. Only those sections of the belts which are located between the supporting rollers 7 and the tensioning rollers 6 then perform the oscillating movement. The up and down oscillating movement of the guide rollers 5 can be produced by any suitable means, for example by a pneumatic, magnetic or mechanical drive. FIGURE 2 illustrates a mechanical type of drive in which the rollers 5 are mounted on ball bearings 12 on stub spindles 13 and are attached by means of the latter to a carriage 14. The carriage slides easily in guide eyes 16' in brackets 16 mounted on a machine frame 15, by means of four guide pins 17 of said carriage. In the carriage 14 there is formed a groove 18 extending at right angles to the direction of oscillating movement and in which there rotates an eccentric 19 fixed to a shaft 20 and driven by a motor (not shown) by way of a V-belt pulley 21. By the rotation of the eccentric there is imparted to the belts by way of the pivotably mounted guide rollers 5, an oscillating movement the period of which can be adjusted independently of the speed of advance of the belts.

This apparatus has the advantage that the sausage casing is very gently treated. It has extensive capacity for adaptation to the particular conditions obtaining, so that very well shirred sausage casings are obtained relatively easily without impairing the strength of the sausage casing to any appreciable extent. The shirring carried out by the apparatus of the invention results in a shirred tube of which the folds are laid very closely together and thereby achieves optimum utilization of space. The laying together of the folds is effected in a steadily progressing rhythm, in the example illustrated one of simple harmonic form, whereby the sausage casings are further protected from damage. By changing the nature of the oscillating drive, for example by control by way of cam discs, the creasing can take place according to a different steadily progressing rhythm if so desired. When the eccentric is made adjustable, it is possible to shirr sausage casings of all tube diameters within the given range of adjustability. Likewise it is possible, by selection of the type of belt, to shirr sausage casings having different cross sections. For example, if a square is chosen for the cross-sectional form of the concertina-like body, the belts are then so formed that they each present a surface including a right angle, so that together they produce a square channel.

It will be obvious to those skilled in the art that many modifications may be made within the scope of the present invention without departing from the spirit thereof, and the invention includes all such modifications.

What is claimed is:

1. An apparatus for shirring sausage casings comprising a mandrel, a pair of belts mounted adjacent the mandrel and forming a channel about the mandrel for advancing a casing in the shirring direction, and means for reciprocating the belts in a direction normal to the shirring direction at the discharge end of the channel.

2. An apparatus according to claim 1 in which the channel has an annular shape.

3. An apparatus according to claim 1 in which the belts at the discharge end of the channel are supported on rolls, the latter being rotatably mounted on a reciprocatable frame.

4. An apparatus according to claim 3 in which the reciprocatable frame engages an eccentric.

5. An apparatus according to claim 1 in which the mandrel is hollow.

6. An apparatus according to claim 1 including means for inflating the sausage casing.

References Cited by the Examiner

UNITED STATES PATENTS

| | | |
|---|---|---|
| 1,993,480 | 3/1935 | Hewitt. |
| 2,010,626 | 8/1935 | Dietrich. |
| 2,583,654 | 1/1952 | Korsgaard _____ 17—1 |
| 2,722,714 | 11/1955 | Blizzard et al. _____ 17—42 |
| 2,819,488 | 1/1958 | Gimbel _____ 17—42 |
| 2,983,949 | 5/1961 | Matecki _____ 17—42 |
| 3,097,393 | 7/1963 | Matecki _____ 17—42 X |
| 3,115,669 | 12/1963 | Matecki _____ 17—42 |

SAMUEL KOREN, *Primary Examiner.*

H. P. DEELEY, JR., *Assistant Examiner.*